(12) United States Patent
Huber et al.

(10) Patent No.: US 10,913,483 B2
(45) Date of Patent: Feb. 9, 2021

(54) DAMPER ASSEMBLY FOR STEERING COLUMN

(71) Applicant: STEERING SOLUTIONS IP HOLDING CORPORATION, Saginaw, MI (US)

(72) Inventors: Albert C. Huber, Montrose, MI (US); Zachery P. Schultz, Munger, MI (US); Tyler M. Reno, Frankenmuth, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 77 days.

(21) Appl. No.: 16/375,007

(22) Filed: Apr. 4, 2019

(65) Prior Publication Data

US 2020/0317253 A1    Oct. 8, 2020

(51) Int. Cl.
*B62D 1/19* (2006.01)
*B62D 1/185* (2006.01)
*B62D 1/184* (2006.01)

(52) U.S. Cl.
CPC ............. *B62D 1/195* (2013.01); *B62D 1/184* (2013.01); *B62D 1/185* (2013.01)

(58) Field of Classification Search
CPC ......... B62D 1/184; B62D 1/185; B62D 1/195
See application file for complete search history.

(56) References Cited

U.S. PATENT DOCUMENTS

| | | | | |
|---|---|---|---|---|
| 6,851,331 B2* | 2/2005 | Kuroumaru | ............ | B62D 1/184 280/775 |
| 7,717,011 B2* | 5/2010 | Hirooka | ................ | B62D 1/184 74/493 |
| 8,590,932 B2* | 11/2013 | Dietz | ..................... | B60R 21/09 280/775 |
| 8,869,647 B2* | 10/2014 | Hirooka | ................ | B62D 1/184 74/493 |
| 8,991,863 B2* | 3/2015 | Hahn | ..................... | B62D 1/184 280/775 |
| 9,260,131 B2* | 2/2016 | Wilkes | ................... | B62D 1/187 |
| 9,308,931 B2* | 4/2016 | Hahn | ..................... | F16H 25/186 |
| 2018/0257692 A1* | 9/2018 | Sauquet | ................ | B62D 1/184 |

* cited by examiner

*Primary Examiner* — Faye M Fleming
(74) *Attorney, Agent, or Firm* — Dickinson Wright PLLC

(57) ABSTRACT

A steering column assembly including a column assembly, a follower assembly, and a cam assembly is provided. The column assembly may be secured to a mount bracket defining a cavity and may include a column housing and a translatable steering column disposed within the column housing. The follower assembly may include a follower mechanically coupled to a lever for rotational movement. The cam assembly may include a cam mechanically coupled to the steering column and arranged for mechanical communication with the follower. The follower and the cam may be arranged with one another upon a shaft such that actuating the lever in a first direction spaces the follower and the cam from one another relative to a shaft axis to generate a clamp load to retain the translatable steering column in position.

20 Claims, 9 Drawing Sheets

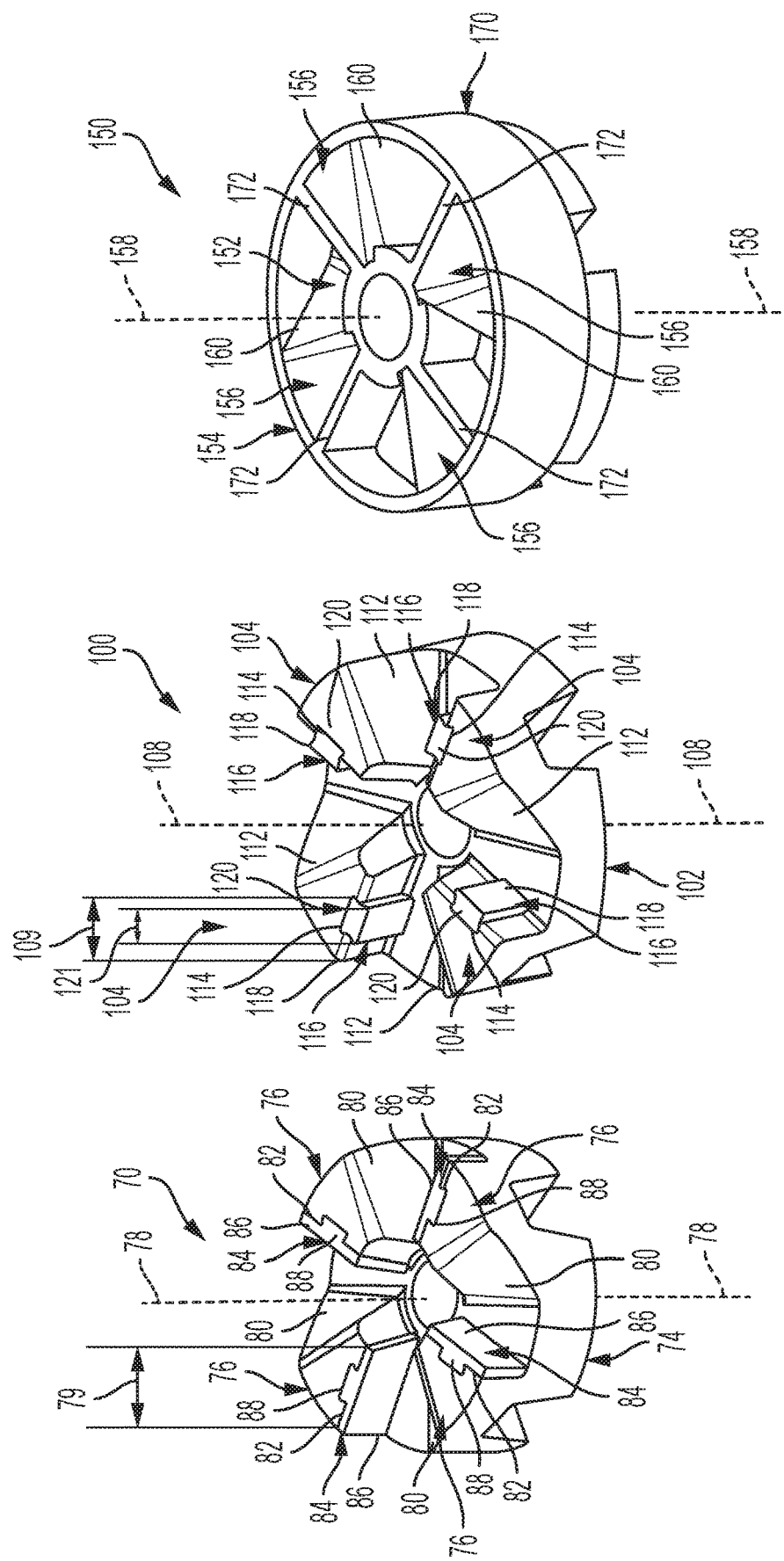

DAMPER ASSEMBLY FOR STEERING COLUMN

BACKGROUND

Manually adjustable steering columns for vehicles may output undesirable noise due to actuation of a lever to lock or unlock movement of the steering column. A main source of the undesirable noise may be a locking cam system. A typical locking cam system includes a set of metal parts (e.g. cam and follower) used to provide displacement and clamp load into the system to lock the steering column in a specific position. The cam set may experience significant loading when in a lock position. When the cam set is in an unlocked position (e.g. the lever is manipulated to unlock the steering column), a follower cam is free to rotate and ride along a surface of a stationary cam until stopped by a stop feature of, for example, the stationary cam. A noise generated by this stopping is a noise often categorized as undesirable by vehicle occupants.

FIG. 1 illustrates a prior art example of a portion of a lock mechanism for a steering column. In this example, a compression spring is part of a lock mechanism and is placed on a rake bolt between a rake lever and a rake cam. The compression spring operates as a damper for the lock mechanism. When the lock mechanism is in an unlocked position, the compression spring provides resistance to a lateral unlocking motion of the lock mechanism. This resistance decreases an amount of energy that reaches a final stopping point on a prong of the rake lever that causes undesirable noise during operation of the lock mechanism.

SUMMARY

According to an embodiment of the present disclosure, a steering column assembly is provided. The steering column assembly includes a column housing, a steering column, a cam assembly, a lever assembly, and a plurality of inserts. The column housing is secured to a mount bracket. The steering column is sized for at least partial insertion into the column housing. The cam assembly is mechanically coupled to the steering column to facilitate locking and unlocking of telescopic movement of the steering column. The cam assembly includes a cam having a plurality of cam extensions. The lever assembly has a lever and a follower component. The follower component includes a plurality of follower extensions, each of the follower extensions includes a ramp located adjacent an insert cutout. Each of the plurality of inserts is sized for at least partial disposal within one of the insert cutouts. The cam assembly and the lever assembly are arranged with one another such that each of the plurality of cam extensions contacts one of the plurality of inserts as promoted by a respective ramp to selectively disengage the lever assembly and the cam assembly from one another to permit telescoping movement of the steering column.

According to another embodiment of the present disclosure, a steering column assembly is provided. The steering column assembly includes a column housing, a steering column, a follower assembly, and a cam assembly. The column housing is secured to a mount bracket. The steering column is sized for at least partial insertion into the column housing. The follower assembly is mechanically coupled to the steering column to facilitate locking and unlocking of telescopic movement of the steering column. The follower assembly includes an inner follower component and a follower housing. The inner follower component has a plurality of follower extensions. Each of the plurality of follower extensions includes a ramp. The follower housing is sized to receive the inner follower component and includes a plurality of walls. Each of the plurality of walls is arranged to define a plurality of quadrant cavities therebetween. Each of the plurality of quadrant cavities is sized to receive one of the plurality of follower extensions. The cam assembly has a cam including a plurality of cam extensions. Each of the plurality of cam extensions is arranged for contacting one of the plurality of walls when the cam is oriented in a first position. Each of the plurality of cam extensions is arranged for being outside a respective one of the plurality of quadrant cavities when the cam is oriented in a second position.

According to yet another embodiment of the present disclosure, a vehicle steering column assembly is provided. The vehicle steering column assembly includes a column assembly, a follower assembly, and a cam assembly. The column assembly is secured to a mount bracket defining a cavity and the column assembly includes a column housing and a translatable steering column disposed within the column housing. The column assembly and the mount bracket are arranged with one another such that at least the steering column extends partially into the cavity. The follower assembly includes a follower mechanically coupled to a lever for rotational movement. The cam assembly includes a cam mechanically coupled to the steering column and arranged for mechanical communication with the follower. The follower and the cam are arranged with one another upon a shaft such that actuating the lever in a first direction spaces the follower and the cam from one another relative to a shaft axis to generate a clamp load to retain the translatable steering column in position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4A is a perspective view of an example of a component of a follower assembly for the steering assembly of FIG. 3A;

FIG. 4B is a perspective view of another example of a component of a follower assembly for the steering assembly of FIG. 3A;

FIG. 4C is a perspective view of an example of components of a follower assembly for the steering assembly of FIG. 3A;

DETAILED DESCRIPTION

Figure 1:
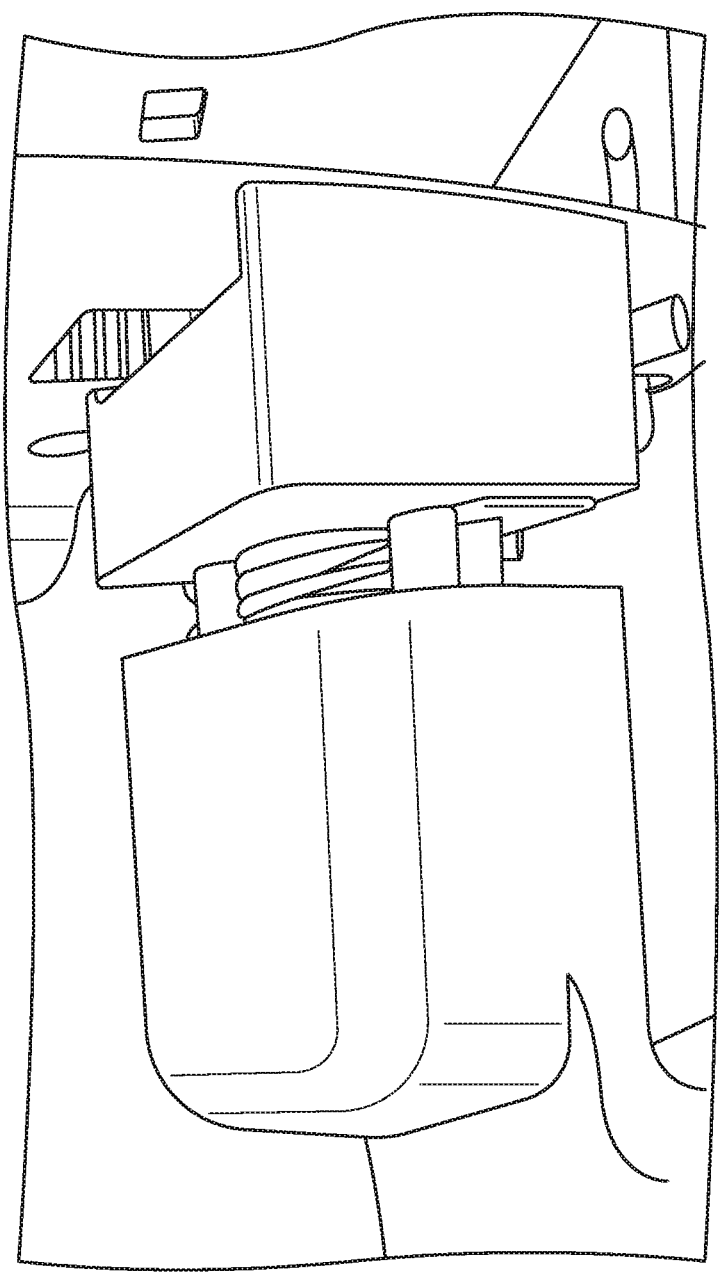
FIG. 1 is a prior art example of a portion of a lock mechanism for a steering assembly.
Figure 2:
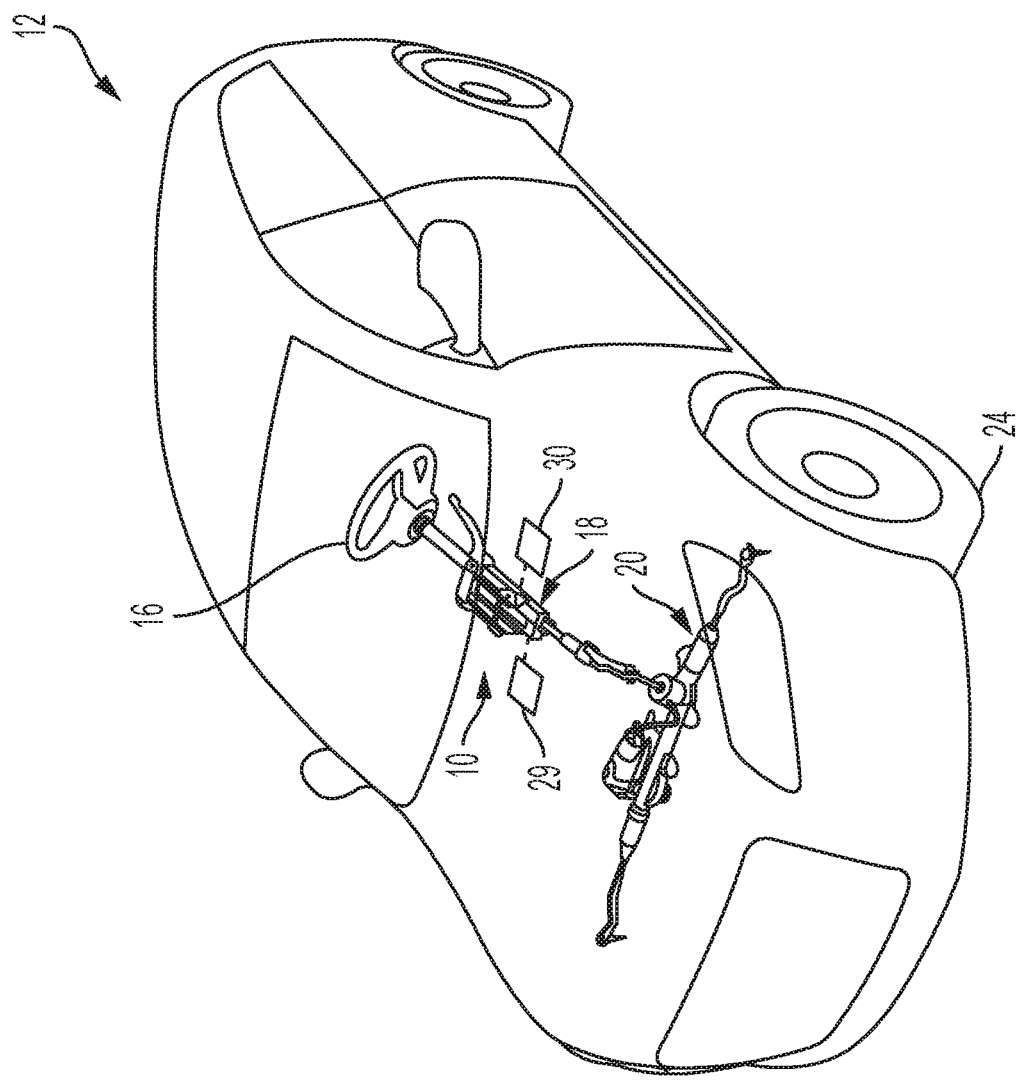
FIG. 2 is a perspective view of an example of a portion of a steering assembly.

Referring now to the Figures, where the invention will be described with reference to specific embodiments, without limiting same, FIG. 2 illustrates an example of a steering assembly for a vehicle, referred to generally as a steering assembly 10 herein. The steering assembly 10 may assist in converting user inputs from a steering wheel 16 to direct movement of a vehicle 12. In this example, the vehicle 12 is a car, however, it is contemplated that the steering assembly 10 may be used to assist in steering other types of vehicles such as trucks, boats, aircraft, or other similar vehicles without departing from a scope of the present disclosure.

The steering assembly 10 may include the steering wheel 16 secured to a steering assembly 18 for rotation. The steering assembly 18 may be operatively connected to a rack and pinion assembly 20 or a steer-by-wire system (not shown). The steering wheel 16, the steering assembly 18, and the rack and pinion assembly 20 may be arranged with one another to direct movement of a front set of wheels 24 (In FIG. 2, only one wheel 24 of the front set of wheels 24 is visible) of the vehicle 12 based on a driver's input. For example, the rack and pinion assembly 20 may be operatively connected to each of the front set of wheels 24 via knuckles and tie rods to convey driver input from the steering wheel 16 for movement of each of the front set of wheels 24.

The steering assembly 10 may be in communication with a controller 29. The controller 29 may include programming to direct operation of components of the steering assembly 10 and/or to direct operation of other vehicle 12 components. The programming, for example, may output vehicle operation commands based on received sensor signals or detected vehicle conditions.

Optionally, the steering assembly 10 may be in communication with a self-steering unit 30, such as an advanced driver assistance system or the like. The self-steering unit 30 may include programming to direct movement of the vehicle 12 without driver input to the steering wheel 16.

Figure 3A:
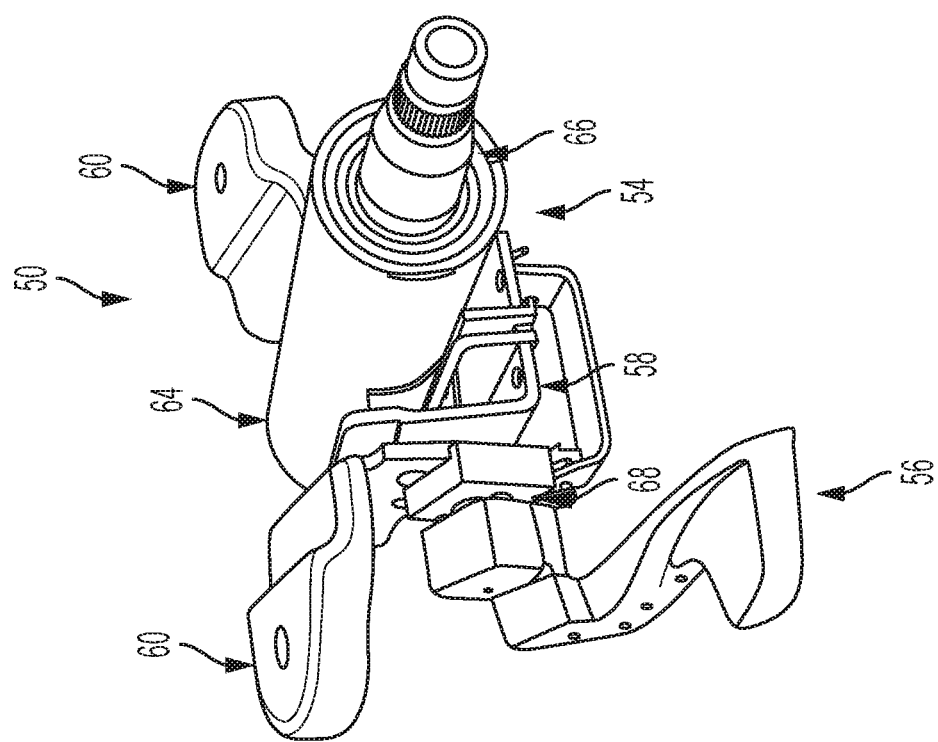
FIG. 3A is a perspective view of an example of a portion of a steering assembly.
Figure 3B:
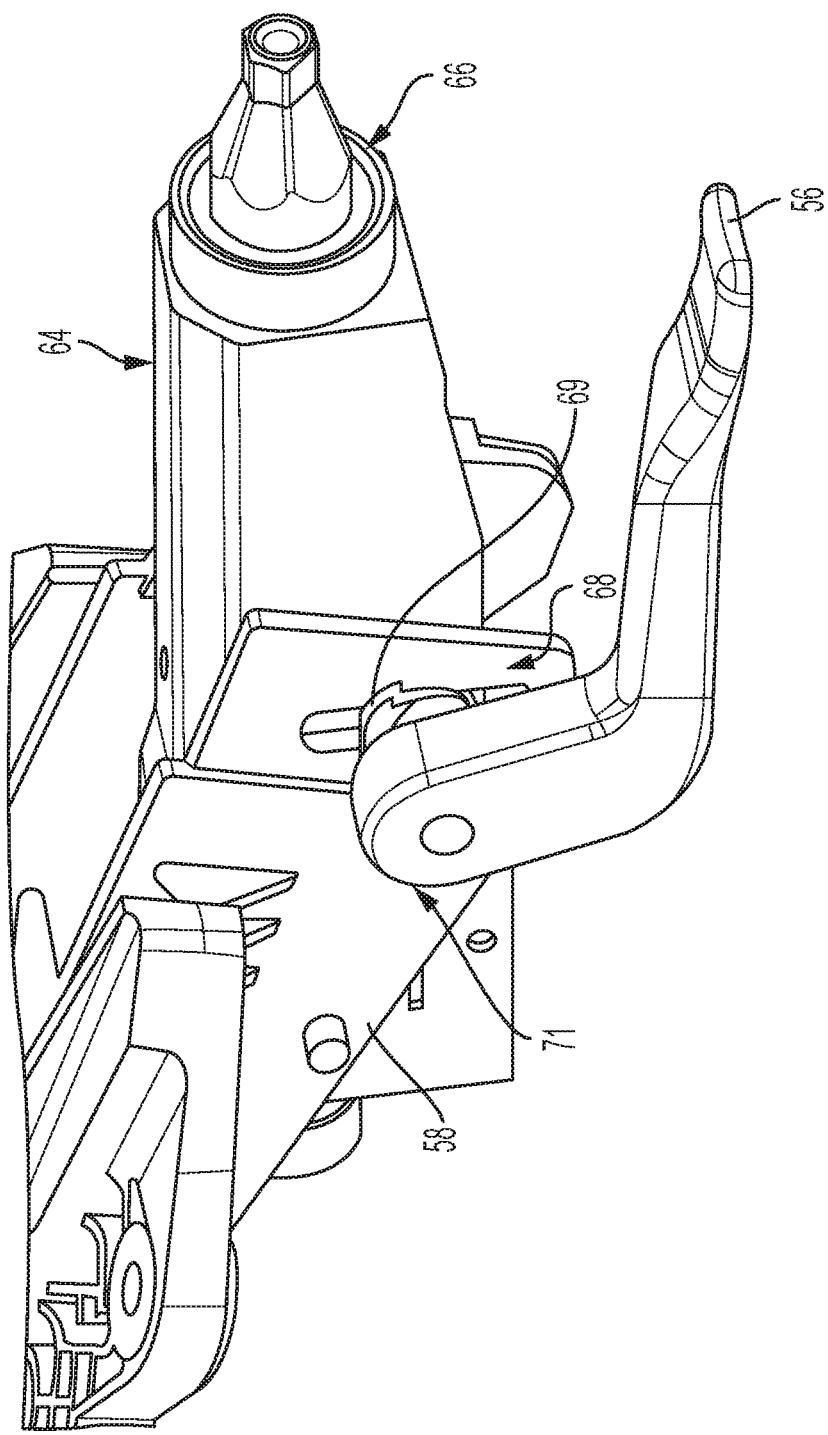
FIG. 3B is a perspective view of a portion of the steering assembly of FIG. 3A.

FIGS. 3A and 3B illustrate an example of a portion of a steering assembly, referred to generally as a steering column assembly 50 herein. The steering column assembly 50 may include components to assist in locking or unlocking movement of a column assembly 54. For example, the steering column assembly 50 may assist in unlocking or locking telescoping movement of a steering column of the column assembly 54.

The steering column assembly 50 may include the column assembly 54, an adjustment lever 56, a first mount bracket 58, and a pair of second mount brackets 60. The column assembly 54 may include a column housing 64 and a steering column 66. The column housing 64 may define a cavity sized to receive at least a portion of the steering column 66. The column housing 64 and the steering column 66 may be arranged with one another to manage and facilitate translational movement of vehicle components, such as the telescoping movement of the steering column 66.

A cam assembly 68 may be arranged with the steering column 66 to assist in facilitating the telescoping movement of the steering column 66. A follower assembly 71 may be arranged with the cam assembly 68 to further assist in managing the telescoping movement of the steering column 66. The cam assembly 68 may include a cam 69 for securing to a portion of the steering assembly 50, such as the first mount bracket 58. The cam 69 may be operatively connected to the steering column 66 via a mechanical linkage (not shown in FIG. 3B). The mechanical linkage may be arranged with the cam 69 such that rotation of the cam 69 may adjust the mechanical linkage to retain the steering column 66 in position or permit movement of the steering column 66.

The follower assembly 71 may include the adjustment lever 56. The adjustment lever 56 may be mechanically coupled to a portion of the cam assembly 68 to selectively lock or unlock movement of the steering column 66 as directed by a user and as further described herein. The adjustment lever 56 may also be referred to as a rake lever.

The column housing 64 may be secured to one or more of the first mount bracket 58 and the pair of second mount brackets 60. The first mount bracket 58 and each of the pair of second mount brackets 60 may be structured for securement to a portion of a steering assembly, such as the steering assembly 10.

FIGS. 4A through 4C illustrate examples of a follower component of the follower assembly 71. In FIG. 4A, a follower 70 is shown that may include a follower body 74 and a plurality of follower extensions 76. Each of the follower extensions 76 may extend from the follower body 74 and may be circumferentially disposed about a follower central axis 78. Each of the follower extensions 76 may define a radial width 79. Each of the follower extensions 76 may include a ramp 80 and an insert cutout 82. Each of the insert cutouts 82 may be sized to receive an insert component 84. Each of the insert components 84 may include an insert body 86 and an insert extension 88. Each of the insert components 84 may define a radial width substantially equal to the radial width 79.

Each of the ramps 80 may be structured to guide a corresponding cam extension for contact with a respective insert component 84. Each of the insert cutouts 82 may be shaped to assist in promoting an interference relationship between a respective insert component 84 and a respective cam extension as further described herein. In one example, each of the insert cutouts 82 may define diagonal portions such that each of the insert extensions 88 defines a trapezoidal shape to promote interference between a surface of a respective follower extension 76 and a surface of a respective insert component 84 as shown in FIG. 4A. The diagonal portions may assist in retaining each insert component 84 within a respective insert cutout 82.

Various materials are available for each of the insert components 84 to assist in reducing noise associated with contact between the follower 70 and the cam during an operation of unlocking or locking movement of the steering column 66. In one example, each of the insert components 84 may be of a material having damping properties, such as a rubber material. Other examples of material which may be used for each of the insert components 84 include non-metallic materials such as polymers, plastics, or foams. The material of each insert component 84 may be selected to minimize noise, vibration, and harshness (NVH) concerns related to locking or unlocking operations of the steering column assembly 50.

In FIG. 4B, another example of a follower is shown, referred to generally as a follower 100 herein. The follower 100 may include a follower body 102 and a plurality of follower extensions 104, each follower extension 104 extending from the follower body 102. Each of the follower extensions 104 may be circumferentially disposed about a follower central axis 108. Each of the follower extensions 104 may define a radial width 109 and may include a ramp 112 and an insert cutout 114. Each of the insert cutouts 114 may be sized to receive an insert component 116. Each of the insert components 116 may include an insert body 118 and an insert extension 120. Each of the insert components 116 may define a radial width 121 of a length less than the radial width 109.

Each of the ramps 112 may be structured to guide a corresponding cam extension of a cam assembly (described below) for contact with a respective insert component 116. Each of the insert cutouts 114 may be shaped to assist in promoting an interference relationship between a respective insert component 116 and a respective cam extension as further described herein. In one example, each of the insert cutouts 114 may define diagonal portions such that each of the insert extensions 120 define a trapezoidal shape to promote interference between a surface of a respective insert cutout 114 and a surface of a respective insert component 116 as shown in FIG. 4B. The diagonal portions may assist in retaining each insert component 116 within a respective insert cutout 114.

In FIG. 4C, yet another example of a follower is shown, referred to generally as a follower assembly 150 herein. The follower assembly 150 may include an inner follower 152 housed within a follower housing 154. The follower housing 154 may also be referred to as a bumper. The inner follower 152 may include a plurality of follower extensions 156. Each of the follower extensions 156 may extend from a body of the inner follower 152. Each of the follower extensions 156 may be circumferentially disposed about a follower central axis 158. Each of the follower extensions 156 may include a ramp 160. Each of the ramps 160 may be structured to guide a corresponding cam extension of a cam assembly for contact with a respective wall of the follower housing 154. The follower housing 154 may include an outer wall 170 defining an outer perimeter of the follower housing 154. The follower housing 154 may further include one or more inner walls 172 extending from an inner surface of the outer wall 170 to define one or more quadrants within the follower housing 154. In FIG. 4C, the outer wall 170 and the one or more inner walls 172 of the follower housing 154 are shown defining four quadrants. Each of the four quadrants is sized to receive a portion of the inner follower 152, such as one of the follower extensions 156.

Various materials are available for the follower housing 154 to assist in reducing noise associated with contact between one of the one or more inner walls 172 and a cam during unlocking or locking operations of the steering column 66. In one example, the follower housing 154 may be of a material having damping properties, such as a rubber material. Other examples of material which may be used for the follower housing 154 include non-metallic materials such as polymers, plastics, or foams. The material of the follower housing 154 may be selected to minimize NVH concerns related to unlocking or locking of a steering column operatively connected thereto.

Figure 5B:
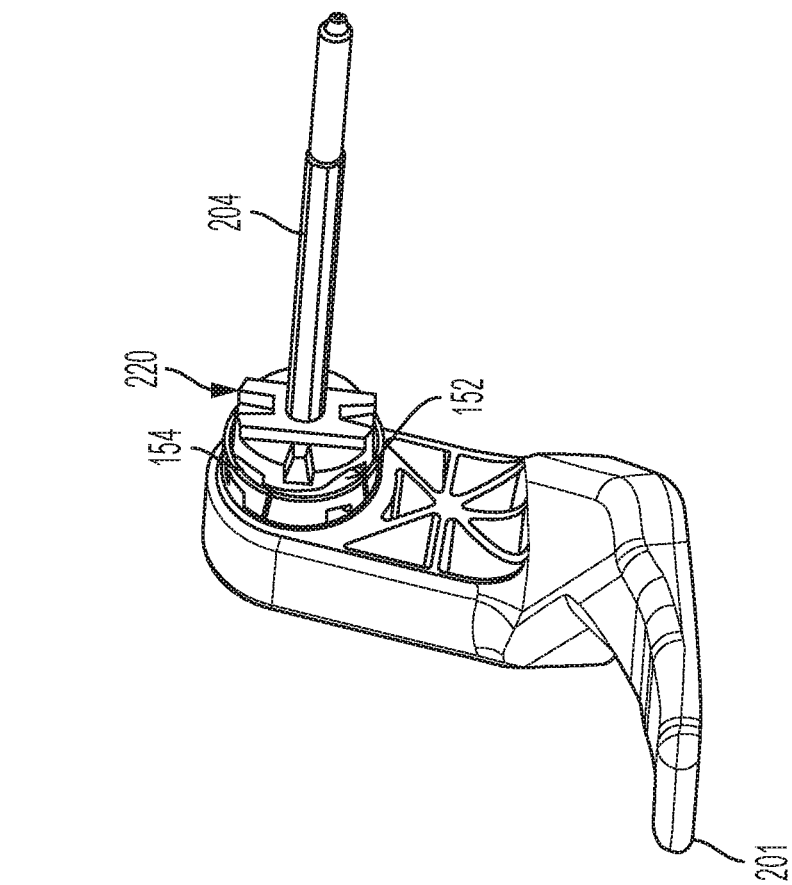
FIG. 5B is a perspective view of the assemblies of FIG. 5A shown assembled.
Figure 5A:
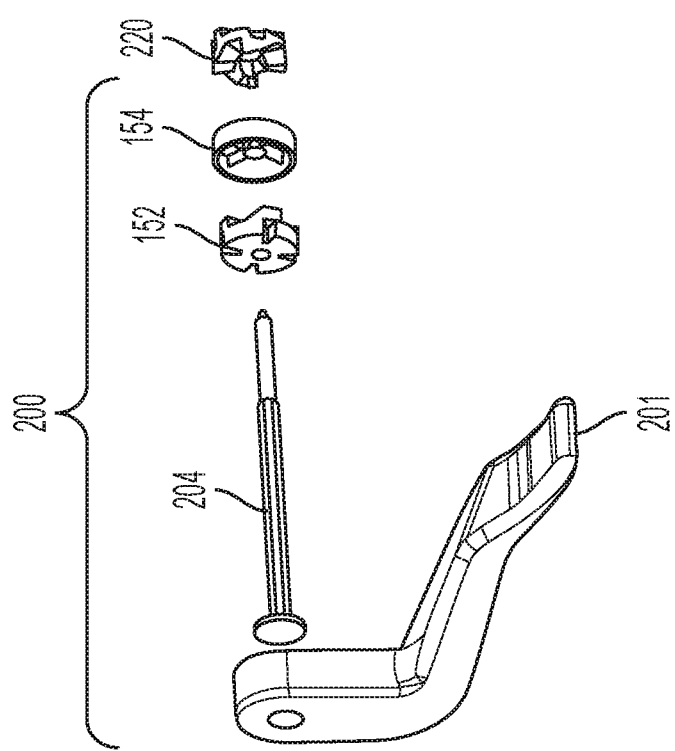
FIG. 5A is an exploded perspective view of an example of a portion of a follower assembly and a portion of a cam assembly.

FIGS. 5A and 5B illustrate an example of a portion of a follower assembly and a portion of a cam assembly. A follower assembly 200 may include a lever 201, the inner follower 152, the follower housing 154, and a rake bolt 204. A cam assembly may include a cam 220. The cam 220 may be operatively connected to a steering column assembly, such as the steering column assembly 50 described above. Optionally, a spring element (not shown in FIG. 5A) may be attached to a portion of a column assembly and arranged with the follower assembly 200 to interact with the cam 220 and bias the cam 220 toward the inner follower 152 and the follower housing 154.

For example, the cam 220 may be operatively connected to a steering column via a mechanical linkage (not shown in FIGS. 5A and 5B). In FIG. 3B, the cam 69 is shown secured to a mount bracket. The mechanical linkage may be arranged with the cam 220 such that rotation of the cam 220 may adjust the mechanical linkage to retain the steering column in position or permit movement of the steering column. The follower assembly 200 and the cam 220 may be arranged with one another such that a user may manipulate the follower assembly 200 to lock or unlock movement of a steering column, such as the steering column 66 of the steering column assembly 50.

Figure 6:
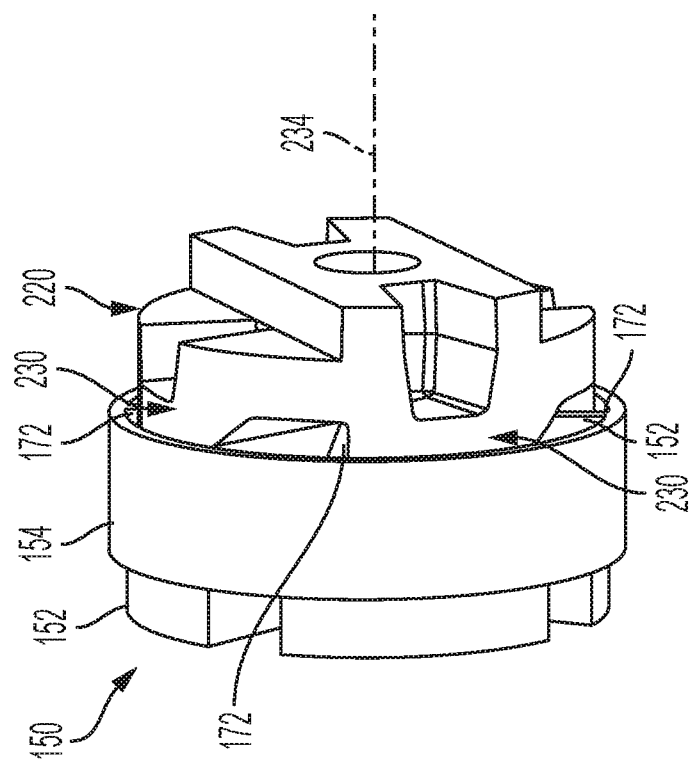
FIG. 6 is a detailed perspective view of a follower component and a cam component shown arranged with one another in a first position.

FIG. 6 illustrates further detail of the inner follower 152, the follower housing 154, and the cam 220 arranged with one another to define a first position. The first position may also be referred to as an unlocked position herein. In the unlocked position, the inner follower 152 and the cam 220 are arranged with one another such that each of the cam extensions 230 extends at least partially into one of the quadrants defined by the one or more inner walls 172 of the follower housing 154. In this unlocked position, the follower 150 and the cam 220 may be arranged with one another such that each of the cam extensions 230 may contact one of the one or more inner walls 172.

Each of the cam extensions 230 may be sized and shaped for insertion between two of the one or more inner walls 172 as guided by a respective one of the ramps 160. In one example, each of the cam extensions 230 may define an angle portion corresponding to a shape of one of the ramps 160 to assist in facilitating engagement and disengagement between each of the follower extensions 156 and the cam 220.

Figure 7B:
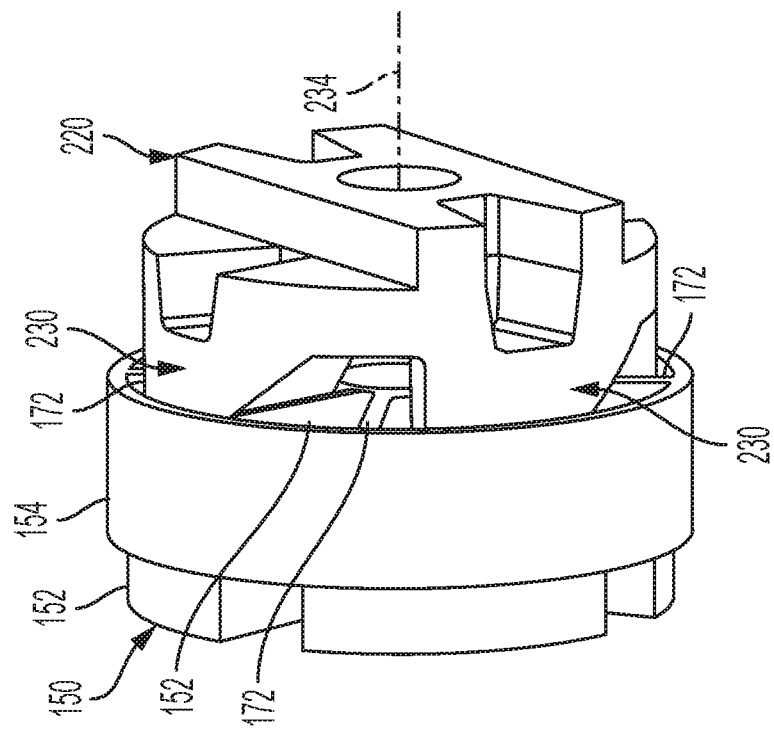
FIG. 7B is a detailed perspective view of the components of FIG. 7A.
Figure 7A:
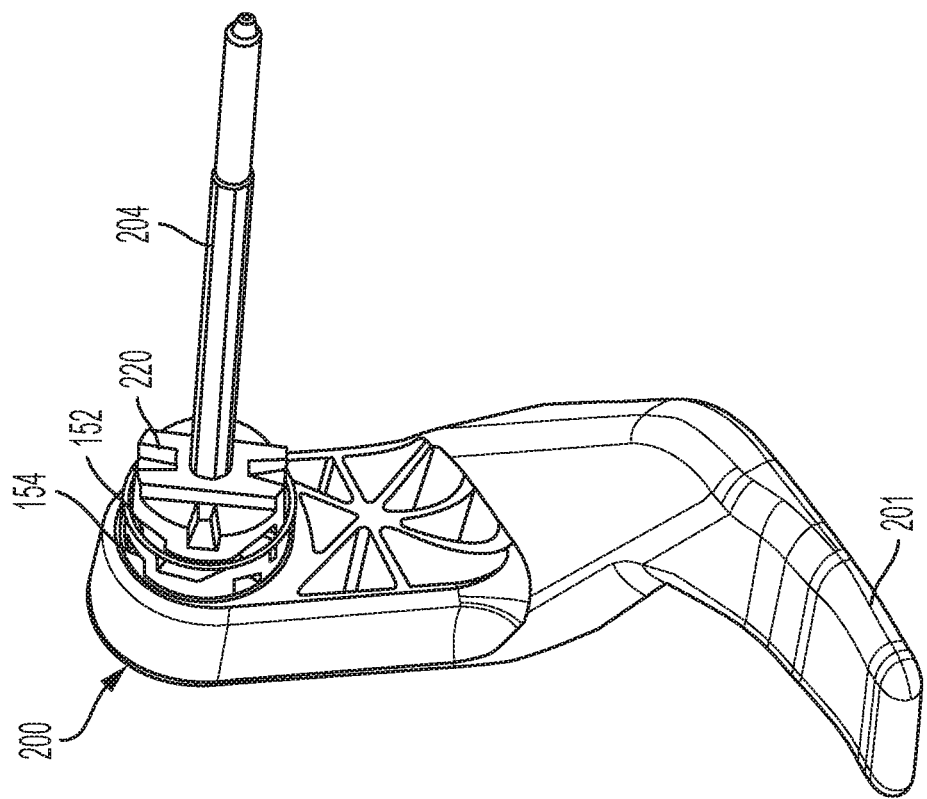
FIG. 7A is a perspective view of a portion of a lever assembly and a portion of a follower assembly.

FIGS. 7A and 7B illustrate an example of the follower assembly 200 and the cam 220 arranged with one another to define a second position. The second position may also be referred to as a mid-position herein. In the mid-position, the follower 150 and the cam 220 may be arranged with one another such that each of the cam extensions 230 extends at least partially into one of the quadrants defined by the one or more inner walls 172 of the follower housing 154 without contacting one of the inner walls 172.

Figure 8B:
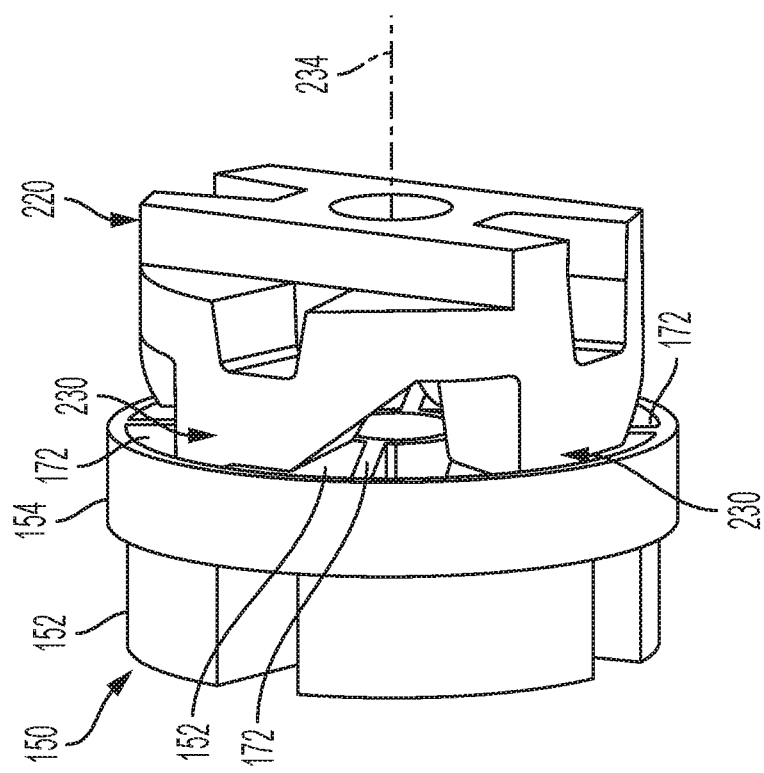
FIG. 8B is a detailed perspective view of a portion of the follower assembly and the cam assembly of FIG. 8A.
Figure 8A:
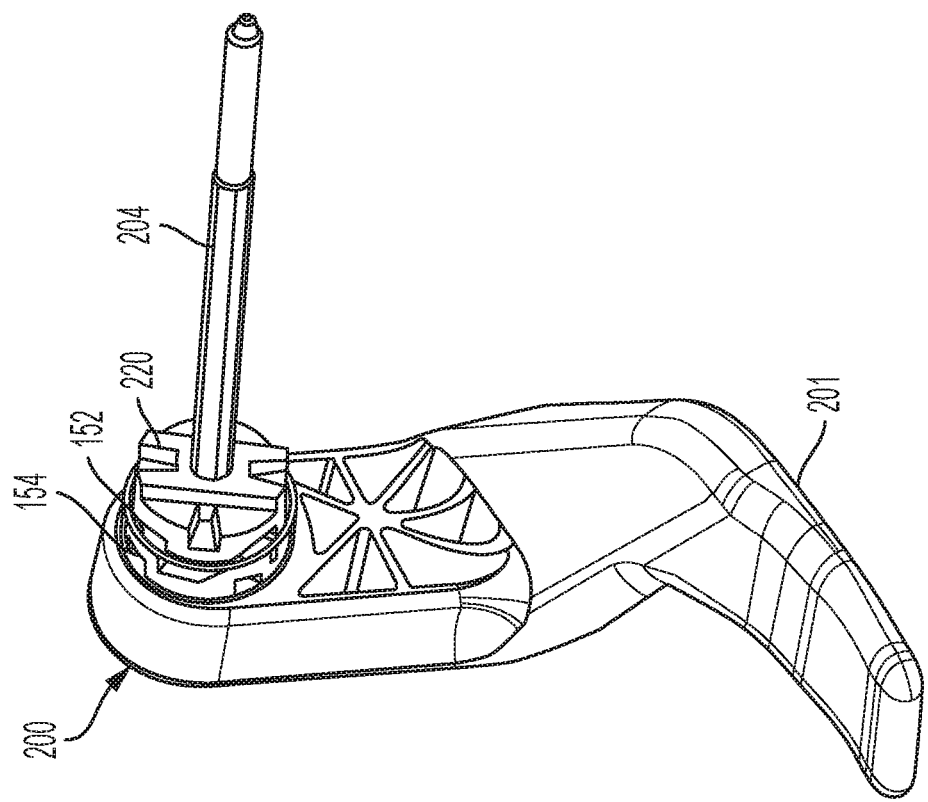
FIG. 8A is a perspective view of an example of a lever assembly, a portion of a follower assembly, and a portion of a cam assembly.

FIGS. 8A and 8B illustrate an example of the follower assembly 200 and the cam 220 arranged with one another to define a third position. The third position may also be referred to as a locked position herein. In the locked position, the follower 150 and the cam 220 may be arranged with one another such that each of the cam extensions 230 is outside of the quadrants defined by the one or more inner walls 172 and the follower housing 154. In this locked position, the follower 150 and the cam 220 are spaced out or pushed apart from one another on an axis defined by the rake bolt 204 to generate a clamp load. This clamp load generated may assist in securing the steering column and the lever in position.

The follower assembly 200 and the cam 220 may be further arranged with one another such that an audio output related to the clamp load is below a predetermined threshold in compliance with NVH requirements. For example, in prior art steering column assemblies, the audio output may be generated as a result of components of a follower assembly and a cam contacting one another during a lock/unlock operation of a steering column assembly. This audio output may be at a level outside of an acceptable threshold related to the NVH requirements. Inclusion of one of the followers described above may reduce a level of the audio output to influence the level to be within the acceptable threshold related to the NVH requirements.

While FIGS. 6 through 8B illustrate three positions defined by the follower assembly 200 and the cam 220, it is to be understood that a structure of the follower assembly 200 and a structure of the cam 220 may facilitate a transition between more than the three positions shown in FIGS. 6 through 8B.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a column housing secured to a mount bracket;
    a steering column sized for at least partial insertion into the column housing;
    a cam assembly mechanically coupled to the steering column to facilitate locking and unlocking of telescopic movement of the steering column, the cam assembly including a cam having a plurality of cam extensions;
    a lever assembly having a lever and a follower component, the follower component including a plurality of follower extensions, each of the plurality of follower extensions including a ramp located adjacent an insert cutout; and
    a plurality of inserts, each of the plurality of inserts sized for at least partial disposal within one of the insert cutouts, the cam assembly and the lever assembly being arranged with one another such that each of the plurality of cam extensions contacts one of the plurality of inserts as promoted by a respective ramp to selectively disengage the lever assembly and the cam assembly from one another to permit telescoping movement of the steering column.

2. The assembly of claim 1, wherein the cam assembly and the lever assembly are further arranged with one another to at least transition between a locked position and an unlocked position.

3. The assembly of claim 2 further comprising a rake bolt, each of the cam and the follower component being disposed about the rake bolt and adjacent one another, the locked position being further defined as a position in which the cam and the follower component are oriented with one another on the rake bolt to generate a clamp load such that an audio output related to the clamp load is below a predetermined threshold in compliance with noise, vibration, and harshness standards.

4. The assembly of claim 2 further comprising a rake bolt, each of the cam and the follower component being disposed about the rake bolt and adjacent one another, the unlocked position being further defined as a position in which the cam and the follower component are oriented with one another on the rake bolt such that the lever may freely rotate relative to an axis defined by the rake bolt.

5. The assembly of claim 1, wherein each of the plurality of follower extensions defines a first radial width and each of the plurality of inserts defines a second radial width of a length substantially equal to a length of the first radial width.

6. The assembly of claim 1, wherein each of the plurality of follower extensions defines a first radial width and each of the plurality of inserts defines a second radial width of a length less than a length of the first radial width.

7. The assembly of claim 1, wherein the lever assembly further has a rake bolt defining a bolt central axis and a spring, the rake bolt being arranged with the cam and the follower component such that the spring is located between the cam and the column housing to bias the cam toward the follower component.

8. The assembly of claim 1 further comprising a spring, wherein the spring is arranged with the cam assembly to bias movement of the cam toward the lever assembly.

9. A steering column assembly comprising:
    a column housing secured to a mount bracket;
    a steering column sized for at least partial insertion into the column housing;
    a follower assembly mechanically coupled to the steering column to facilitate locking and unlocking of telescopic movement of the steering column, the follower assembly including
        an inner follower component having a plurality of follower extensions, each of the plurality of follower extensions including a ramp, and
        a follower housing sized to receive the inner follower component, the follower housing including a plurality of walls, each of the plurality of walls arranged to define a plurality of quadrant cavities therebetween, each of the plurality of quadrant cavities sized to receive one of the plurality of follower extensions; and
    a cam assembly having a cam including a plurality of cam extensions, each of the plurality of cam extensions arranged for contacting one of the plurality of walls when the cam is oriented in a first position and each of the plurality of cam extensions being arranged for being outside a respective one of the plurality of quadrant cavities when the cam is oriented in a second position.

10. The assembly of claim 9, wherein the follower assembly further includes a lever in mechanical communication with the cam assembly such that a user may move the lever to disengage the cam to facilitate cam movement from the second position to the first position.

11. The assembly of claim 9, wherein each of the ramps is structured to guide one of the plurality of cam extensions toward a respective one of the plurality of walls.

12. The assembly of claim 9, wherein the cam and the inner follower component are arranged with one another to generate a clamp load to retain the cam in the first position or the second position such that an audio output related to the clamp load is below a predetermined threshold in compliance with noise, vibration, and harshness standards.

13. The assembly of claim 9, wherein the follower housing is of a rubber material.

14. The assembly of claim 9, wherein the follower assembly further includes a shaft and a spring, the inner follower component, the follower housing, the cam and the spring being arranged relative to the shaft such that the spring biases the cam in a direction along a shaft axis towards the inner follower component and the follower housing.

15. A vehicle steering column assembly comprising:
a column assembly secured to a mount bracket defining a cavity, the column assembly including a column housing and a translatable steering column disposed within the column housing, the column assembly and the mount bracket arranged with one another such that at least the steering column extends partially into the cavity;
a follower assembly including a follower mechanically coupled to a lever for rotational movement; and
a cam assembly including a cam mechanically coupled to the translatable steering column and arranged for mechanical communication with the follower, the follower and the cam are arranged with one another upon a shaft such that actuating the lever in a first direction spaces the follower and the cam from one another relative to a shaft axis to generate a clamp load to retain the translatable steering column in position.

16. The assembly of claim 15 further comprising a spring disposed upon the shaft between the cam and the column assembly to bias the cam toward the follower.

17. The assembly of claim 15, wherein the follower includes a plurality of follower extensions each extending from a body of the follower, each of the plurality of follower extensions including a ramp extending from the body, the follower and the cam being further arranged with one another to generate the clamp load such that an audio output related to the clamp load is below a predetermined threshold in compliance with noise, vibration, and harshness standards.

18. The assembly of claim 15, the follower including an inner component and a housing component sized to receive the inner component, the housing component including one or more walls arranged with one another to define a plurality of quadrants, each of the plurality of quadrants sized to receive an inner extension of the inner component, the inner component and the housing component being arranged with one another such that a plurality of ramps of the inner component are arranged to guide extensions of the cam for contact with the one or more walls.

19. The assembly of claim 15 further comprising a plurality of inserts, the follower defining a plurality of extensions each having an insert cutout sized to receive a portion of one of the plurality of inserts, a radial width of each of the plurality of inserts being substantially equal to a radial width of one of the plurality of extensions.

20. The assembly of claim 15 further comprising a plurality of inserts, the follower defining a plurality of extensions each having an insert cutout sized to receive a portion of one of the plurality of inserts, a radial width of each of the plurality of inserts being less than a radial width of one of the plurality of extensions.

* * * * *